US012086190B2

(12) United States Patent
Aikoh (10) Patent No.: US 12,086,190 B2
(45) Date of Patent: Sep. 10, 2024

(54) METADATA PROPAGATION METHOD FOR GRAPH STRUCTURE DATA

(71) Applicant: Hitachi, Ltd., Tokyo (JP)

(72) Inventor: Kazuhide Aikoh, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 213 days.

(21) Appl. No.: 17/862,038

(22) Filed: Jul. 11, 2022

(65) Prior Publication Data

US 2024/0012858 A1    Jan. 11, 2024

(51) Int. Cl.
*G06F 16/906*    (2019.01)
*G06F 16/22*    (2019.01)
*G06F 16/25*    (2019.01)

(52) U.S. Cl.
CPC ........ *G06F 16/906* (2019.01); *G06F 16/2264* (2019.01); *G06F 16/254* (2019.01)

(58) Field of Classification Search
CPC ... G06F 16/906; G06F 16/2264; G06F 16/254
See application file for complete search history.

(56) References Cited

U.S. PATENT DOCUMENTS

| 2009/0083306 | A1* | 3/2009 | Sichi | G06Q 10/00 707/999.102 |
| 2017/0116295 | A1* | 4/2017 | Wan | G06F 16/254 |
| 2019/0310982 | A1 | 10/2019 | Aikoh et al. | |

OTHER PUBLICATIONS

Hamilton, William L. et al. Inductive Representation Learning on Large Graphs. Department of Computer Science. Stanford University. 31st Conference on Neural Information Processing Systems (NIPS 2017), Long Beach, CA, USA. 11 pages.

* cited by examiner

*Primary Examiner* — Baoquoc N To
(74) *Attorney, Agent, or Firm* — Procopio, Cory, Hargreaves & Savitch LLP (57) ABSTRACT

A method for determining metadata propagation generated by an Extract, Transfer, Load (ETL) process. The method may include categorizing metadata given to data sources to generalize the metadata and categorizing the ETL process to generalize the ETL process; defining propagation rules for the generalized metadata and generalized ETL process; and generating metadata for ETL-converted data based on the categorization of the generalized metadata and generalized ETL process, and corresponding ones of the propagation rules.

14 Claims, 12 Drawing Sheets

METADATA PROPAGATION METHOD FOR GRAPH STRUCTURE DATA

BACKGROUND

Field

The present disclosure is generally directed to a method of metadata management, and more specifically, to a method of metadata propagation for graph structure data.

Related Art

In recent years, low-code tools have been garnering attention due to their abilities to build fluid functional applications through visual representations with minimal complex coding. In the field of data engineering, a Data Flow Editor corresponds to an example of a low-code tool, and allows even beginners to easily write data preparation logic in data flow format. There also exists data catalog tools that analyze the contents of data sources and add metadata for data understanding and data retrieval. However, if these tools are used in combination, a metadata extraction process needs to be performed every time new data is generated from the Data Flow Editor.

In the related art, metadata to be propagated is determined based on classification rule. Two classification rules exist, with the first rule determining metadata based on the characteristics of data source and the second rule for determining metadata based on extract, transform, and load (ETL) operations. However, two problems exist with this method. First, only the metadata described in the rule can be added. Second, metadata that needs to be recalculated, such as statistics, cannot be added as well.

SUMMARY

Aspects of the present disclosure involve an innovative method for determining metadata propagation generated by an Extract, Transfer, Load (ETL) process. The method may include categorizing metadata given to data sources to generalize the metadata and categorizing the ETL process to generalize the ETL process; defining propagation rules for the generalized metadata and generalized ETL process; and generating metadata for ETL-converted data based on the categorization of the generalized metadata and generalized ETL process, and corresponding ones of the propagation rules.

Aspects of the present disclosure involve an innovative non-transitory computer readable medium, storing instructions for determining metadata propagation generated by an Extract, Transfer, Load (ETL) process. The instructions may include categorizing metadata given to data sources to generalize the metadata and categorizing the ETL process to generalize the ETL process; defining propagation rules for the generalized metadata and generalized ETL process; and generating metadata for ETL-converted data based on the categorization of the generalized metadata and generalized ETL process, and corresponding ones of the propagation rules.

Aspects of the present disclosure involve an innovative management server system for determining metadata propagation by an Extract, Transfer, Load (ETL) process. The management server may include a processor, configured to categorize metadata given to data sources to generalize the metadata and categorizing the ETL process to generalize the ETL process; define propagation rules for the generalized metadata and generalized ETL process; and generate metadata for ETL-converted data based on the categorization of the generalized metadata and generalized ETL process, and corresponding ones of the propagation rules.

Aspects of the present disclosure involve an innovative system for determining metadata propagation generated by an Extract, Transfer, Load (ETL) process. The system can include means for categorizing metadata given to data sources to generalize the metadata and categorizing the ETL process to generalize the ETL process; means for defining propagation rules for the generalized metadata and generalized ETL process; and means for generating metadata for ETL-converted data based on the categorization of the generalized metadata and generalized ETL process, and corresponding ones of the propagation rules.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

DETAILED DESCRIPTION OF THE INVENTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 1:
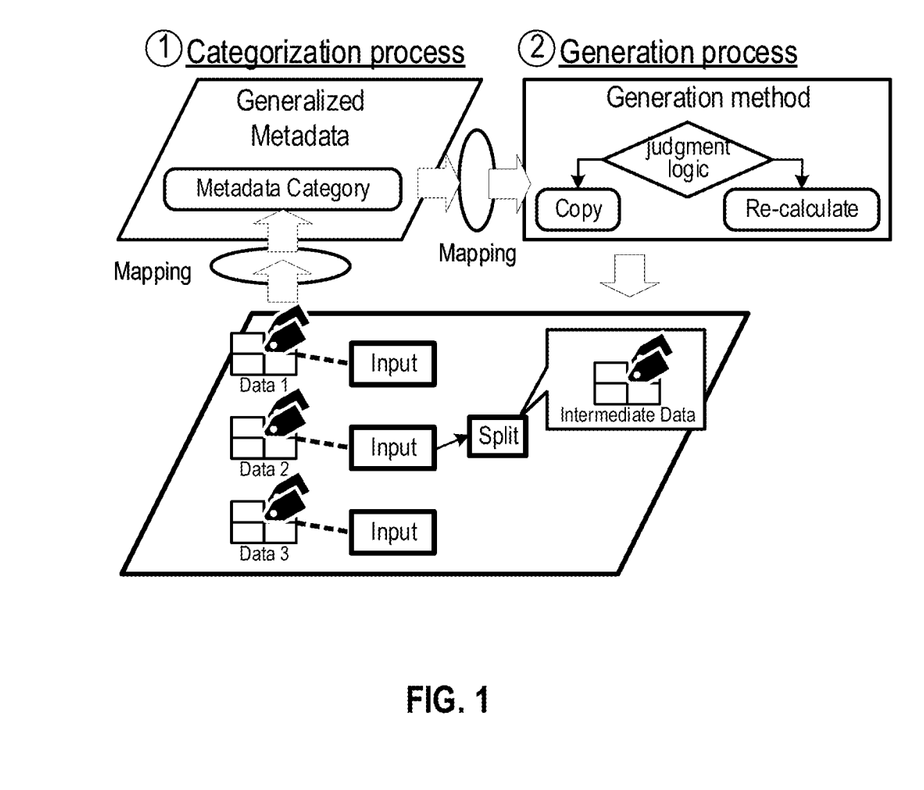
FIG. 1. illustrates an example metadata propagation process flow, in accordance with an example implementation.

FIG. 1. illustrates an example metadata propagation process flow, in accordance with an example implementation. The problem with existing methods lies in direct mapping with previously specified rules that are rigid and inflexible. The present method utilizes a categorization process and a generation process that avoid rigid application of strict rules. The categorization process involves generalization of metadata. As for the generation process, this involves propagation through a judgment logic in determining whether a metadata is to be copied as is or needing to be recalculated. Mapping of metadata type and ETL type is required in moving from one process to another.

The method can get metadata for ETL-converted tables with fewer rule definitions and supports expansion of metadata extraction processing function and ETL processing functions without changing rules. This also allows shortening metadata extraction time to add metadata to ETL-converted table in ETL processing.

Figure 2:
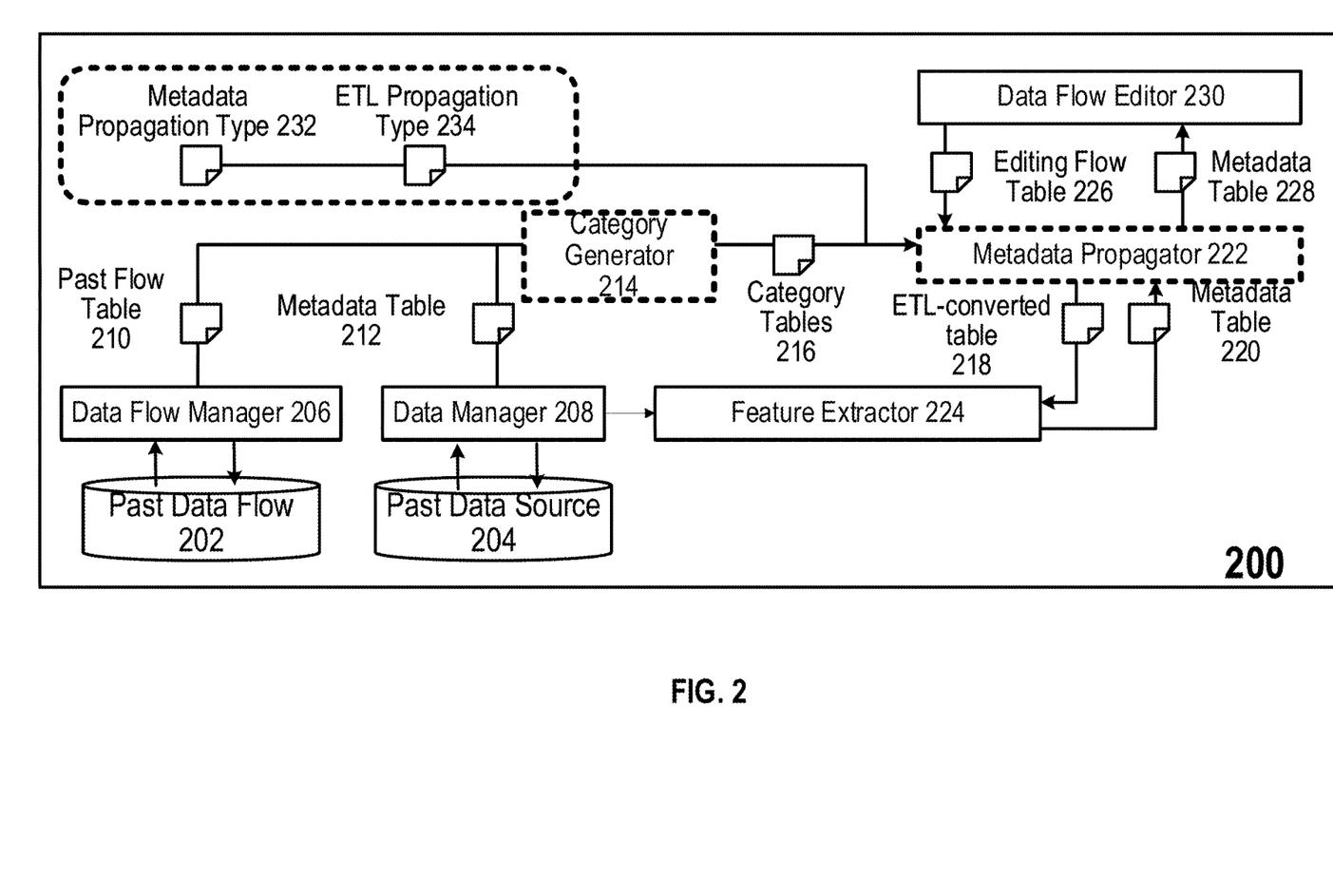
FIG. 2 illustrates an example metadata propagation system, in accordance with an example implementation.

FIG. 2 illustrates an example metadata propagation system, in accordance with an example implementation. In the example metadata propagation system 200, there is a past data flow 202, a past data source 204, a data flow manager 206, a data manager 208, a category generator 214, a metadata propagator 222, a feature extractor 224, a data flow editor 230, a metadata propagation type 232, and an ETL propagation type 234. The data manager 208 manages the past data source 204, which contains historical data collected. The data flow manager 206 manages the past data flow 202, which contains historical ETL flow data collected. In alternate example implementations, the historical data and historical ETL flow data can be stored to a central repository or central database such as proprietary databases that intake data, or systems such as enterprise resource planning systems, and the data manager 208 and the data flow manager 206 can access or retrieve the historical data and historical ETL flow data from the central repository or central database. The data manager 208 is configured to generate a metadata table 212 and the data flow manager 206 is configured to generate a past flow table 210.

Figure 6:
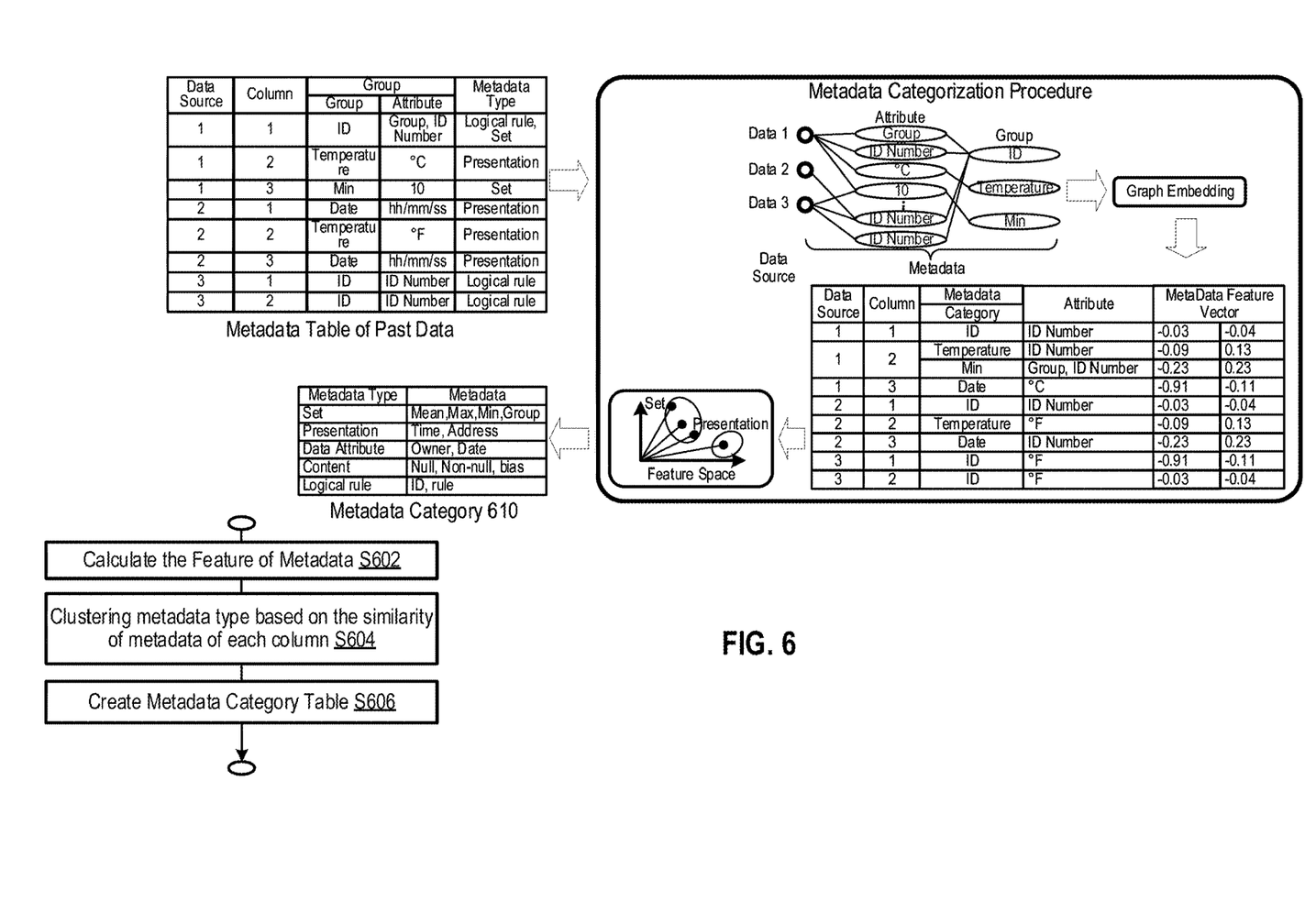
FIG. 6 illustrates an example flow chart of a metadata categorization procedure, in accordance with an example implementation.
Figure 7:
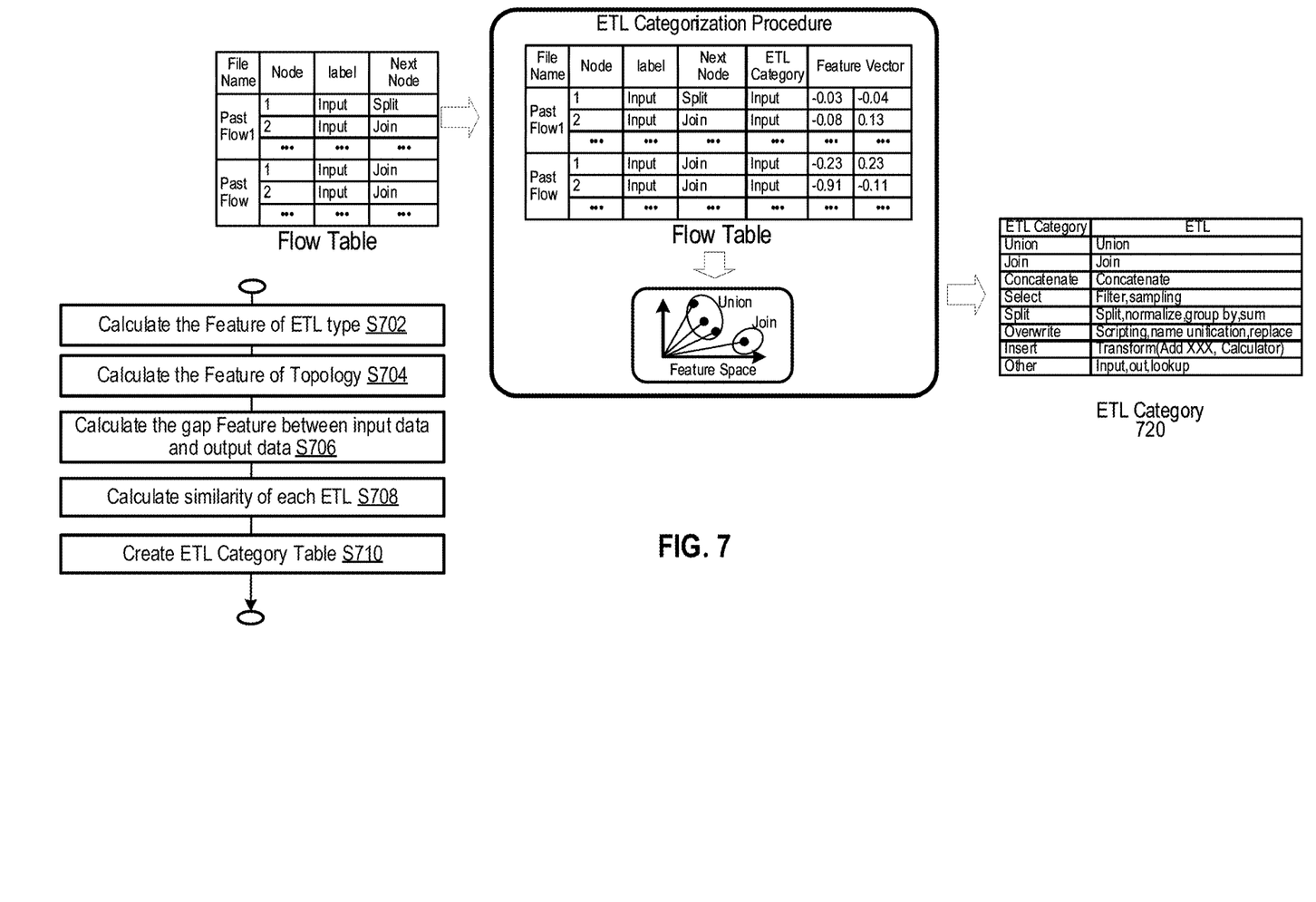
FIG. 7 illustrates an example flow chart of an ETL categorization procedure, in accordance with an example implementation.

The category generator 214 is configured to take the past flow table 210 and the metadata table 212 as inputs and generates category tables 216 as output. The category tables 216 include a metadata category table 610 and an ETL category table 720, described in details below. The category tables 216 serve as input to the metadata propagator 222.

There are two main components to the present system. Specifically, the category generator 214 and the metadata propagator 222. The category generator 214 generates the category tables 216 for generalizing metadata from past data sources and ETL information. The metadata propagator 222 decides whether to copy or recalculate the metadata of ETL-converted table 218 generated by running the editing flow table 226 in the data flow editor 230, based on the generated category tables 216 and propagation rules contained in metadata propagation type 232 and ETL propagation type 234, triggered by the data processing operation in the data flow editor 230 and the received editing flow table 226.

Metadata table 228 is generated as the output of the metadata propagator 222. If it is determined at the metadata propagator 222 to copy the metadata based on the propagation rule, then the metadata is added to the metadata table 228. The feature extractor 224 allows for recalculation of the metadata associated with the ETL-converted table 218 and outputs metadata table 220 back to the metadata propagator 222 for incorporation of metadata into the metadata table 228.

Figure 3:
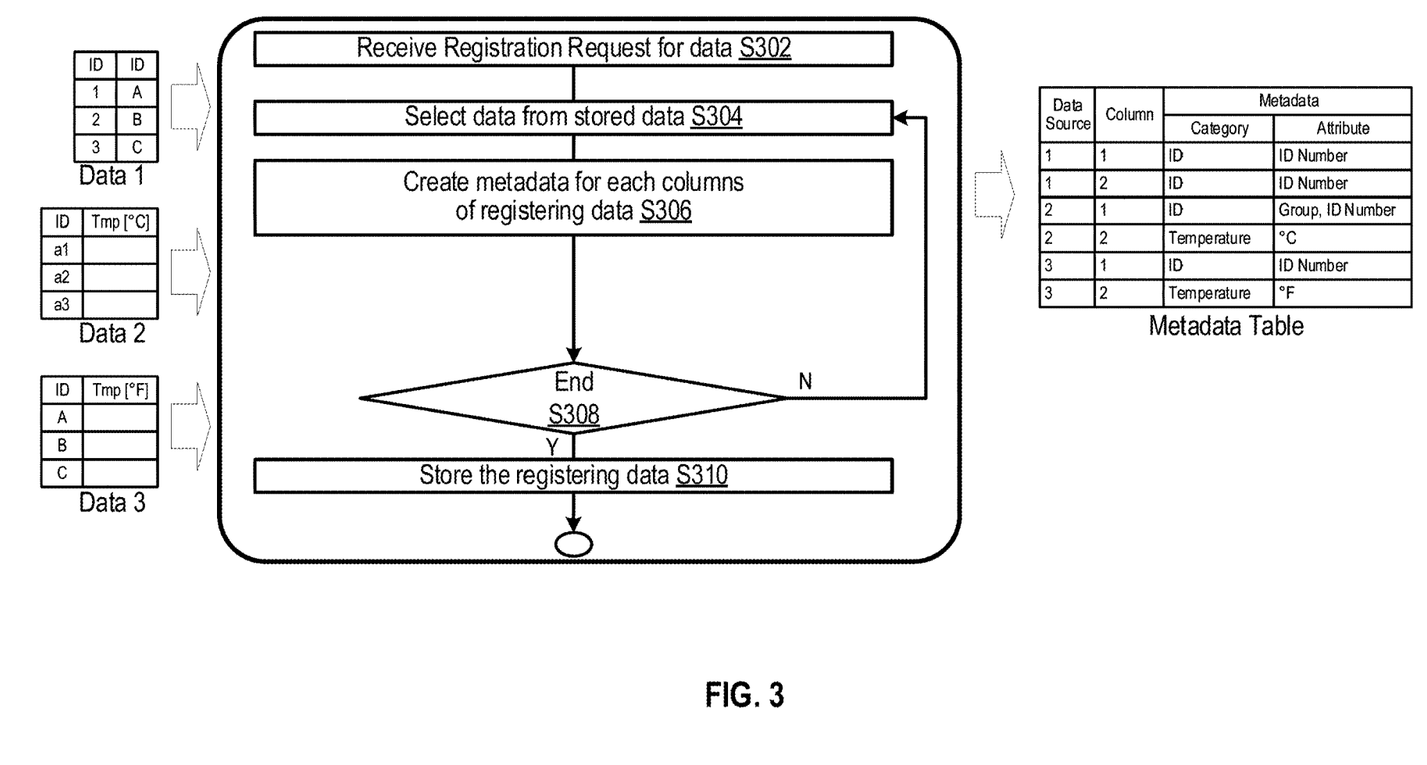
FIG. 3 illustrates an example flow chart for a data manager, in accordance with an example implementation.

FIG. 3 illustrates an example flow chart for the data manager 208, in accordance with an example implementation. When the data manager 208 receives a registration request for data at S302, the data manager 208 selects data source information from the past data source 204 at S304. As illustrated in FIG. 3, data 1, data 2, and data 3 are each selected from the past data source 204. At S306, metadata is created for each column of data being registered. The metadata table is created by parsing the information in each column. Taking data 1 for example, metadata is generated for the two columns of "ID". Metadata associated with a registered data can be classified by categories and attributes generated using feature extractor 224. For data 1, the category for the first "ID" column is "ID" and the attribute is "ID Number". In example implementations any machine learning methods or user defined rule generation methods can be utilized for automatic determination of metadata.

At S308, the data manager 208 determines whether the metadata creation/generation process has been performed for all registered data and associated columns. If not, the process returns to S304 to select the next registered data for processing. If yes, registered data is stored in a storage device at S310. The storage device in the example implementation may be a volatile memory or a non-volatile memory, or may include both volatile and non-volatile memories. The storage device may be a Random Access Memory (RAM), such as Static Random Access Memory (SRAM), Dynamic Random Access Memory (DRAM), Synchronous Dynamic Random Access Memory (SDRAM). The storage device described herein is intended to include, but not limited to, these and any other suitable types of storage devices. Following S310, metadata generated is populated in the form of a metadata table, specifically, metadata table 212 of FIG. 2. The metadata table 212 serves as input to the category generator 214.

Figure 4:
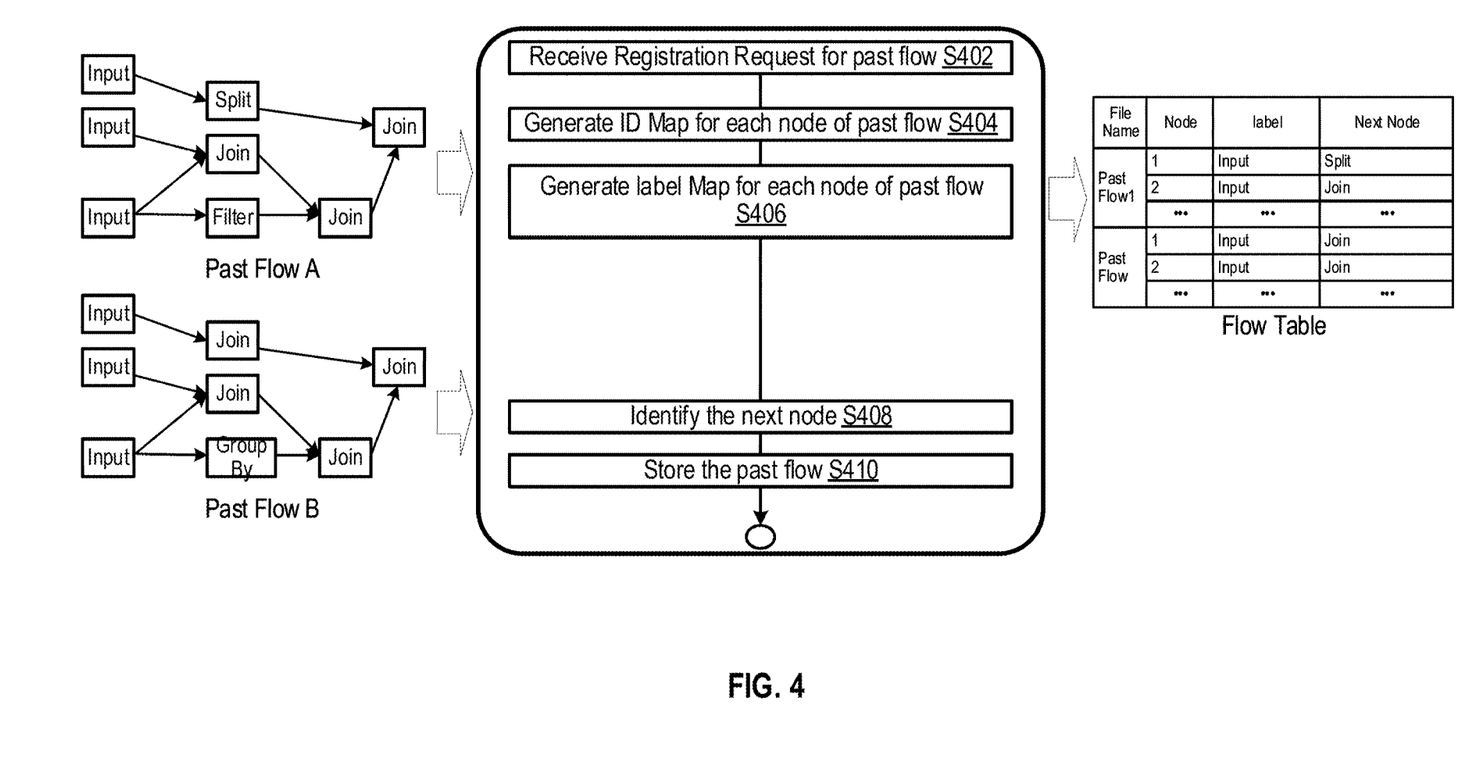
FIG. 4 illustrates an example flow chart for a data flow manager, in accordance with an example implementation.

FIG. 4 illustrates an example flow chart for the data flow manager 206, in accordance with an example implementation. When the data flow manager 206 receives a registration request for past flow at S402, the data flow manager 206 generates an ID map for each node of the past flow at S404. As illustrated in FIG. 4, past flow A and past flow B are selected from the past data flow 202 for registration, with nodes identified and mapped in a flow table. At S406, a label is generated for each node of the registered past flow. Taking Past Flow A for example, the top left node is identified as node 1 and has a corresponding flow label of "input". Hence, the label for the particular node is input.

At S408, the data flow manager 206 identifies a label for a subsequent node following the current node. Taking node 1 of Past Flow A for example, subsequent node following node 1 (input) is "split", where the arrow is pointed. Hence, the label "split" is provided in the flow table as the next node. At S410, after completion of flow mapping for all registered past flow, the registered past flow is stored in a storage device. The storage device in the example implementation may be a volatile memory or a non-volatile memory, or may include both volatile and non-volatile memories. The storage device may be a Random Access Memory (RAM), such as Static Random Access Memory (SRAM), Dynamic Random Access Memory (DRAM), Synchronous Dynamic Random Access Memory (SDRAM). The storage device described herein is intended to include, but not limited to, these and any other suitable types of storage devices. Following step 310, past flow mapping generated is populated in the form of the flow table, specifically, past flow table 210 of FIG. 2. The past flow table 210 serves as input to the category generator 214.

Figure 5:
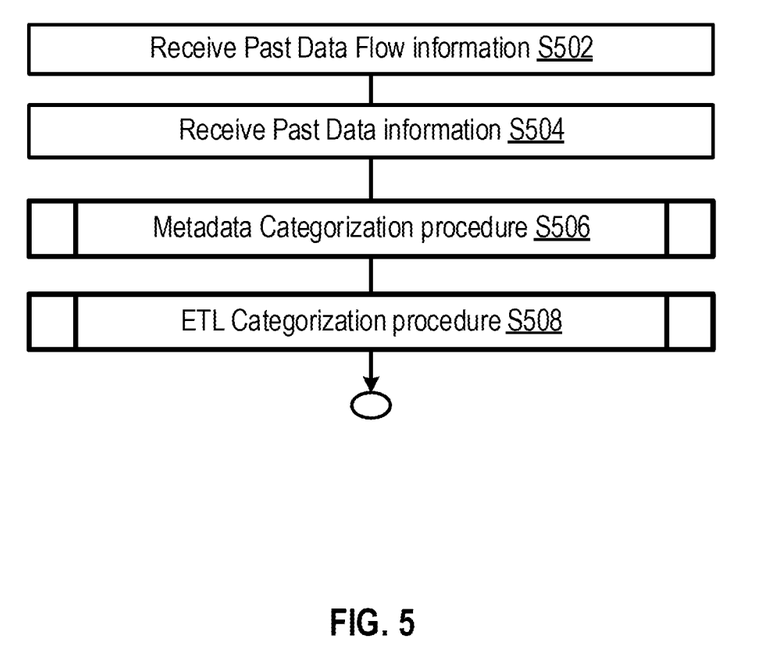
FIG. 5 illustrates an example flow chart for a category generator, in accordance with an example implementation.

FIG. 5 illustrates an example flow chart for the category generator 214, in accordance with an example implementation. The category generator 214 receives past data flow information at S502 and receives past data information at S504. The past data flow information corresponds to the past flow table 210 and the past data information corresponds to the metadata table 212. At S506, the category generator 214 is configured to perform a metadata categorization procedure over the received metadata table 212. At S508, an ETL categorization procedure is performed over the received past flow table 210. The metadata categorization procedure and the ETL categorization procedure will be described in more detail below.

FIG. 6 illustrates an example flow chart of a metadata categorization procedure, in accordance with an example implementation. First, a graph representation of the metadata table 212 is generated. Each metadata has an associated metadata group that represents the categories and attributes associated with the given data source. However, definition of the metadata group can vary among the different products. At S602, by generating graph embedding by using the graph representation as a feature, it is possible to calculate/categorize based on similarities of metadata groups, attributes and other associated columns in the metadata table 212. Taking column 1 of data source 1 in the metadata table in FIG. 6 as an example, the graphic representation to the right connects data 1 to metadata attributes "Group" and "ID Number". The metadata attributes "Group" and "ID Number" associated with data 1 are further connected to the metadata group "ID".

In some example implementations, GraphSAGE is utilized as a graph embedding for calculating feature vectors of metadata for the nodes. GraphSAGE is a method for extracting the topological feature of a graph by expressing the relationship between nodes with neural network. Taking column 1 of data source 1 in the metadata table in FIG. 6 as an example, the corresponding metadata feature vector for group ID as calculated is [−0.03, −0.04]. Next, a metadata type is clustered based on similarity of metadata at S604. As shown in FIG. 6, using the set grouping in the feature space chart as an example, if the metadata mean, max, min, and group are found to be within the local neighborhood of the node set, then they are categorized under the metadata type set. After clustering process is completed for all metadata, metadata category is created generalizing and exhibiting relationships between the various metadata types and metadata.

By extracting the features for each group from this graphic representation and clustering each metadata type, a metadata category table 610 showing the correspondence between the generalized metadata and associated metadata type is generated at S606. Categorization is made possible based on similarity of metadata types, attributes, and the metadata.

FIG. 7 illustrates an example flow chart of an ETL categorization procedure, in accordance with an example implementation. Similar to the metadata categorization procedure of FIG. 6, the ETL categorization procedure utilizes a graph embedding to calculate features for the past flow table 210. Clustering is performed based on the similarity of features to generate an ETL category table 720 showing the correspondence between each ETL process and ETL category. At S702, feature of ETL type is calculated. At S704, feature of topology is calculated. At S706, a gap feature between input data and output data is calculated. At S708, similarity of each ETL is calculated. At S710, ETL category table 720 is created.

Figure 8:
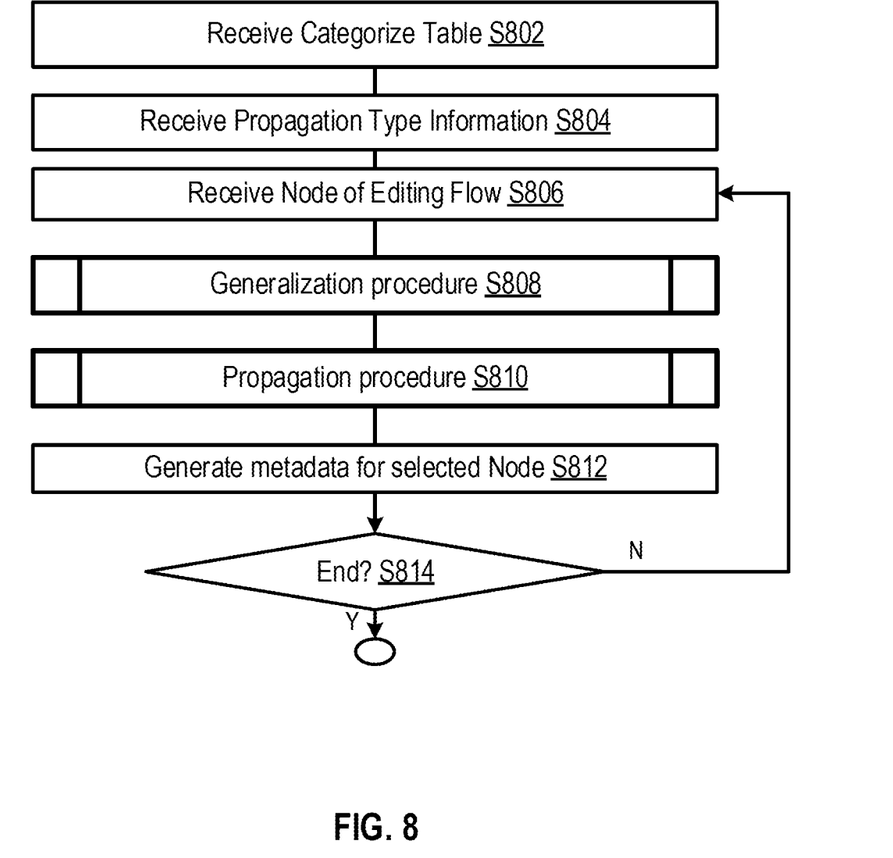
FIG. 8 illustrates an example flow chart for a metadata propagator, in accordance with an example implementation.

FIG. 8 illustrates an example flow chart for a metadata propagator 222, in accordance with an example implementation. The metadata propagator 222 generates the metadata of the ETL-converted table 218 of the ETL process being edited in data flow editor 230. At S802, category tables such as the metadata category table 610 and the ETL category table 720 are received. At S804, propagation type information including metadata propagation type 232 and ETL propagation type 234 are received. At S806, node of editing flow or editing flow table 226 is received from the data flow editor 230. At S808, a generalization procedure is performed according to the ETL editing operation on the data flow editor 230. At S810, a propagation procedure is performed according to the ETL editing operation on the data flow editor 230. At S812, metadata is generated for the selected node. At S814, a determination is made as to whether the process has come to an end. If the answer is yes, then the process ends. If the answer is no, then the process proceeds back to S806 for additional processing with another received node.

Figure 9:
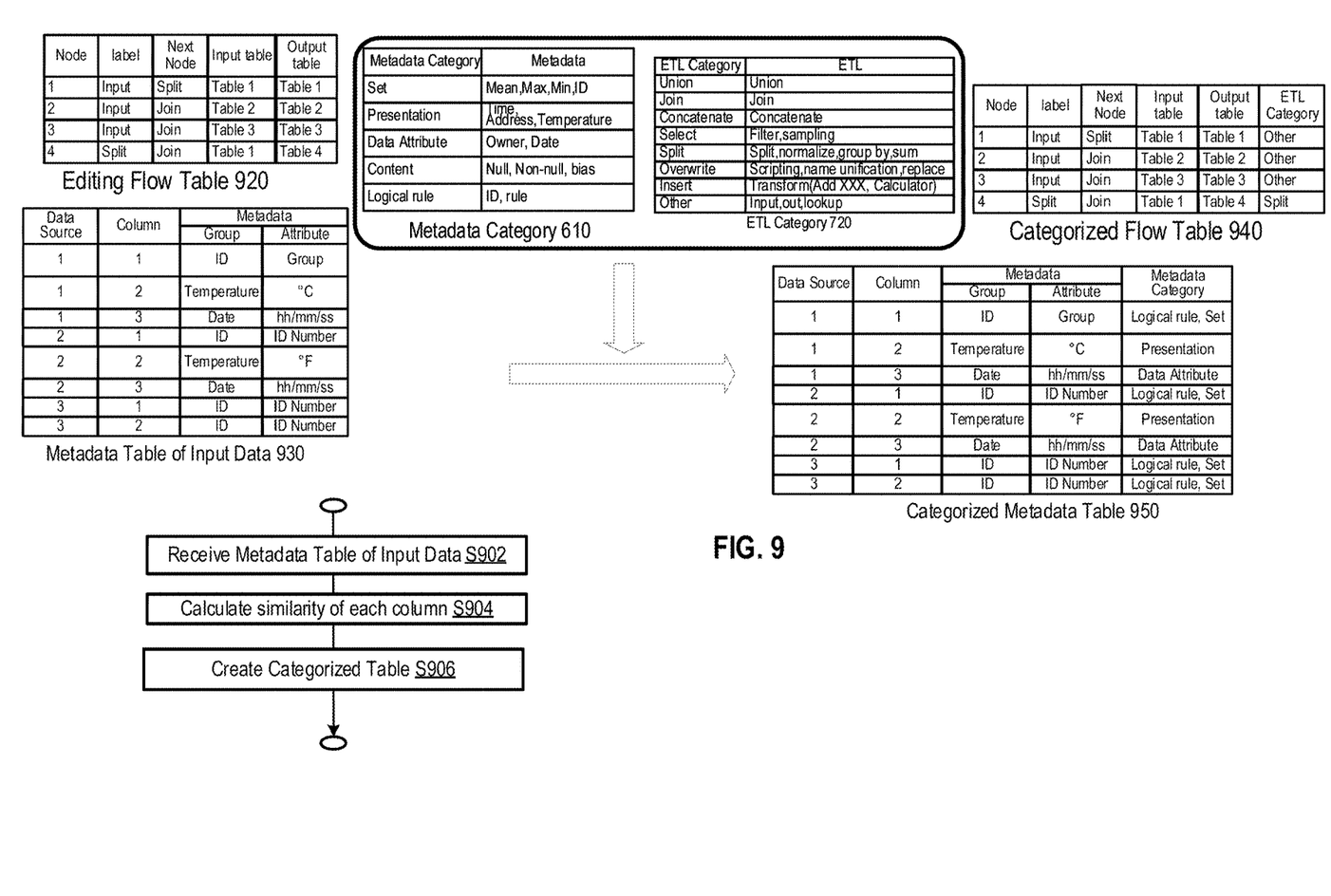
FIG. 9 illustrates an example flow chart of a generalization procedure, in accordance with an example implementation.

FIG. 9 illustrates an example flow chart of the generalization procedure of the metadata propagator shown in FIG. 8, in accordance with an example implementation. At S902, metadata table of input data 930 and editing flow table 920 are received. At S904, metadata type column of the metadata category table 610 is searched/calculated to find a value that matches the metadata group field of the metadata table of input data 930. Then, the metadata category field of the categorized metadata table 950 is identified with the value of the metadata category field of the record that contains the value of the metadata group found in the metadata type column of the metadata category table 610.

For example, the first entry under metadata group column of the metadata table of input data 930 is "ID", and "ID" can be identified in the first and last entries of the metadata column of the metadata category table 610. The entries in the metadata category table 610 have the corresponding metadata categories of "Set" and "Logical rule", which means that "ID" is categorized into "Set" and "Logical rule". Therefore, the metadata category field of the corresponding first entry in the categorized metadata table 950 is identified with "Set" and "Logical rule".

Similarly, label column of editing flow table 920 is searched to find a value that matches the ETL field of ETL category table 720, and then the ETL category field of categorized flow table 940 is identified with the value of ETL category field of the entry that contains the value of the label field found in the ETL column of ETL category table 720.

At S906, categorized tables including categorized flow table 940 and categorized metadata table 950 are created based on the calculation step of S904. The categorized flow table 940 and categorized metadata table 950 include the information contained in the metadata table of input data 930 and the editing flow table 920, and include the additional columns of metadata category and ETL category respectively.

Figure 10:
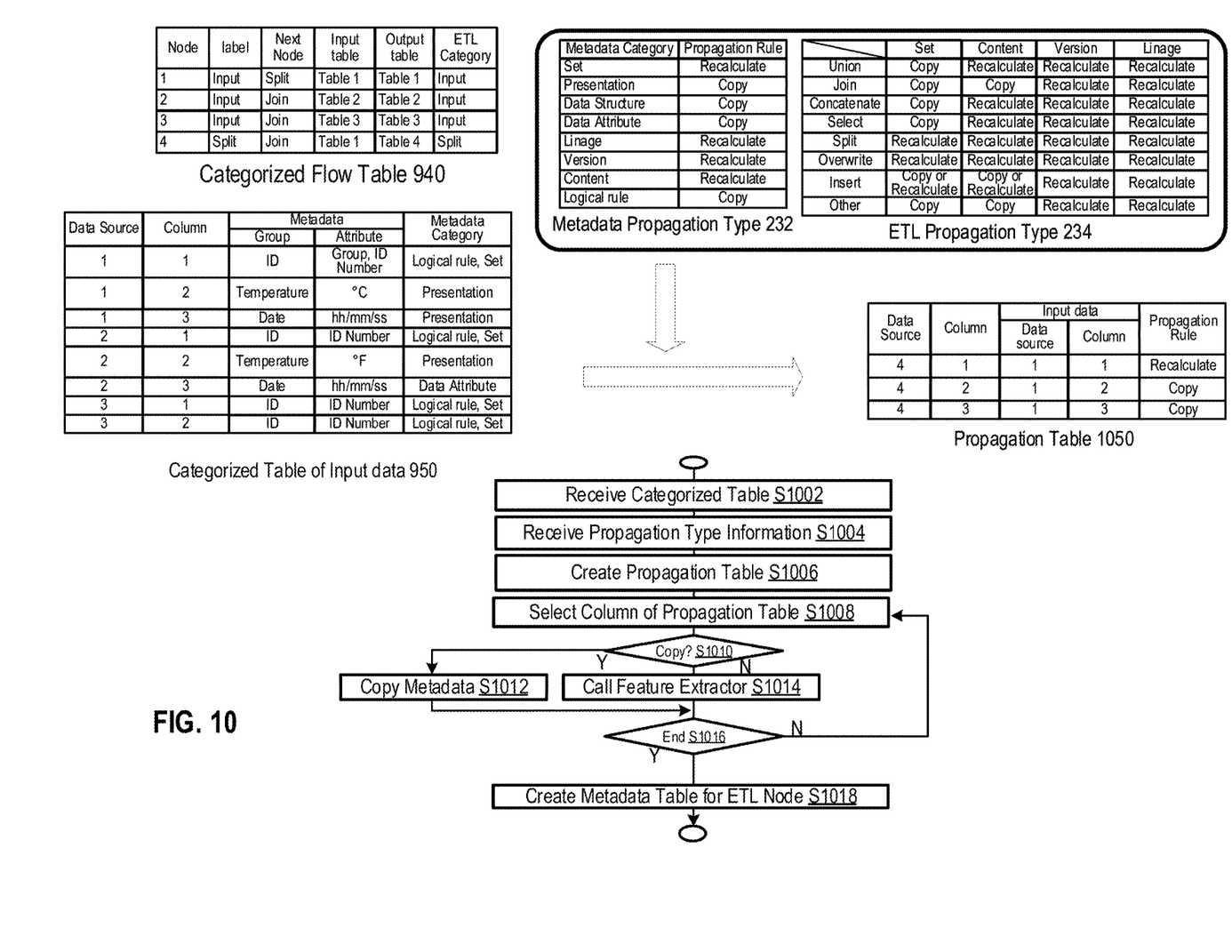
FIG. 10 illustrates an example flow chart of a propagation procedure, in accordance with an example implementation.

FIG. 10 illustrates an example flow chart of the propagation procedure of the metadata propagator shown in FIG. 8, in accordance with an example implementation. At S1002, categorized flow table 940 and categorized metadata table 950 are received. At S1004, propagation type information including metadata propagation type 232 and ETL propagation type 234 are received. At S1006, a propagation table 1050 is created by applying propagation rules contained within metadata propagation type 232 and ETL propagation type 234 to the categorized flow table 940 and categorized metadata table 950. The propagation table 1050 identifies data source and column information associated with metadata and stores propagation rule relating to subsequent processing in association to the metadata. At S1008, a row of the propagation table is selected for processing. At S1010, a determination is made as to whether to copy the metadata based on the associated propagation rule. If the answer is yes, then metadata is copied based on the "copy" indicator shown under propagation rule at S1012. If the answer is no, then feature extractor 224 is used to recalculate metadata at S1014. Completion of steps S1012 and S1014 both lead to S1016, where a determination is made as to whether all metadata for the ETL-converted table has been processed. If the response is no, then the process returns to S1008 for further selection and processing. If the response is yes, then the process proceeds to S1018, where a metadata table is created for the received ETL node.

Second Embodiment

In this embodiment, while structural data is targeted, metadata table created from metadata extracted from semi-structured data and non-structural data such as images, movies, and documents in natural language may also be targeted.

In the metadata categorization procedure and ETL categorization procedure, the propagation feature model may be used instead of metadata category table 610. In doing so, unknown metadata that is not contained in the training data may be generalized, which may include new functions of product, application of another data catalog products, or ETL products, without retraining.

Figure 11:
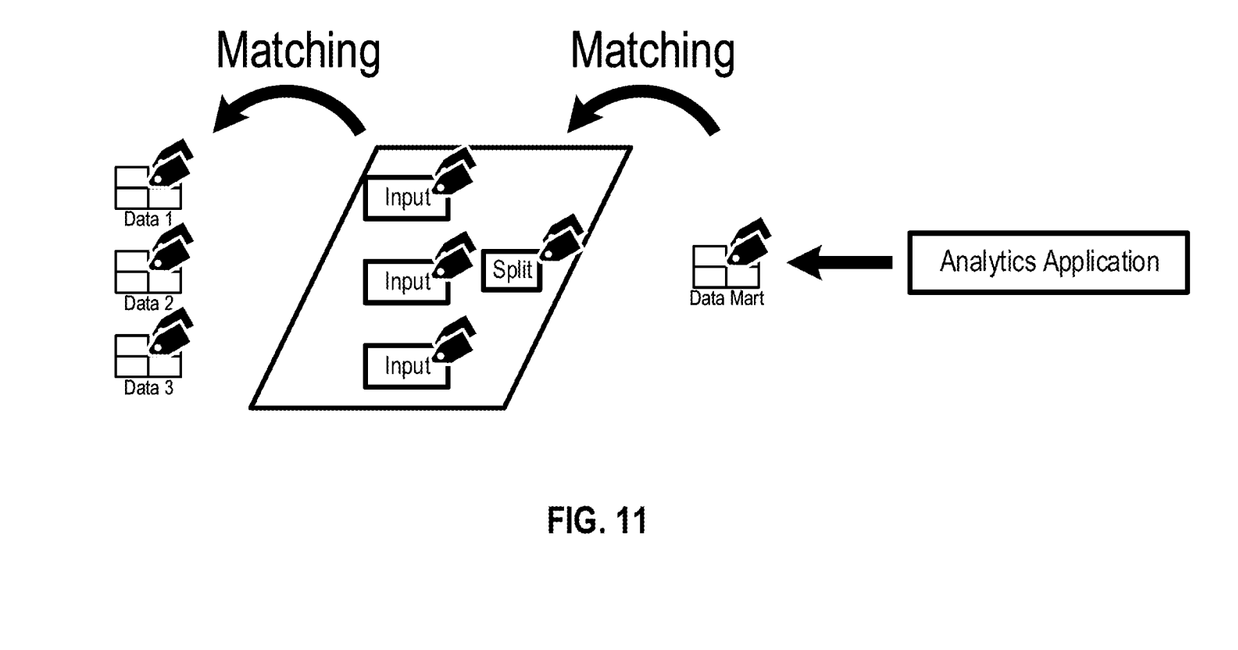
FIG. 11 illustrates an ETL reuse use case, in accordance with an example implementation.

FIG. 11 illustrates an ETL reuse use case, in accordance with an example implementation. By holding the metadata propagated as a set with the ETL flow and by mapping it to data mart metadata and the data source metadata, a determination can be made as to whether the ETL flow is reusable and find the data source for the analytics application.

Figure 12:
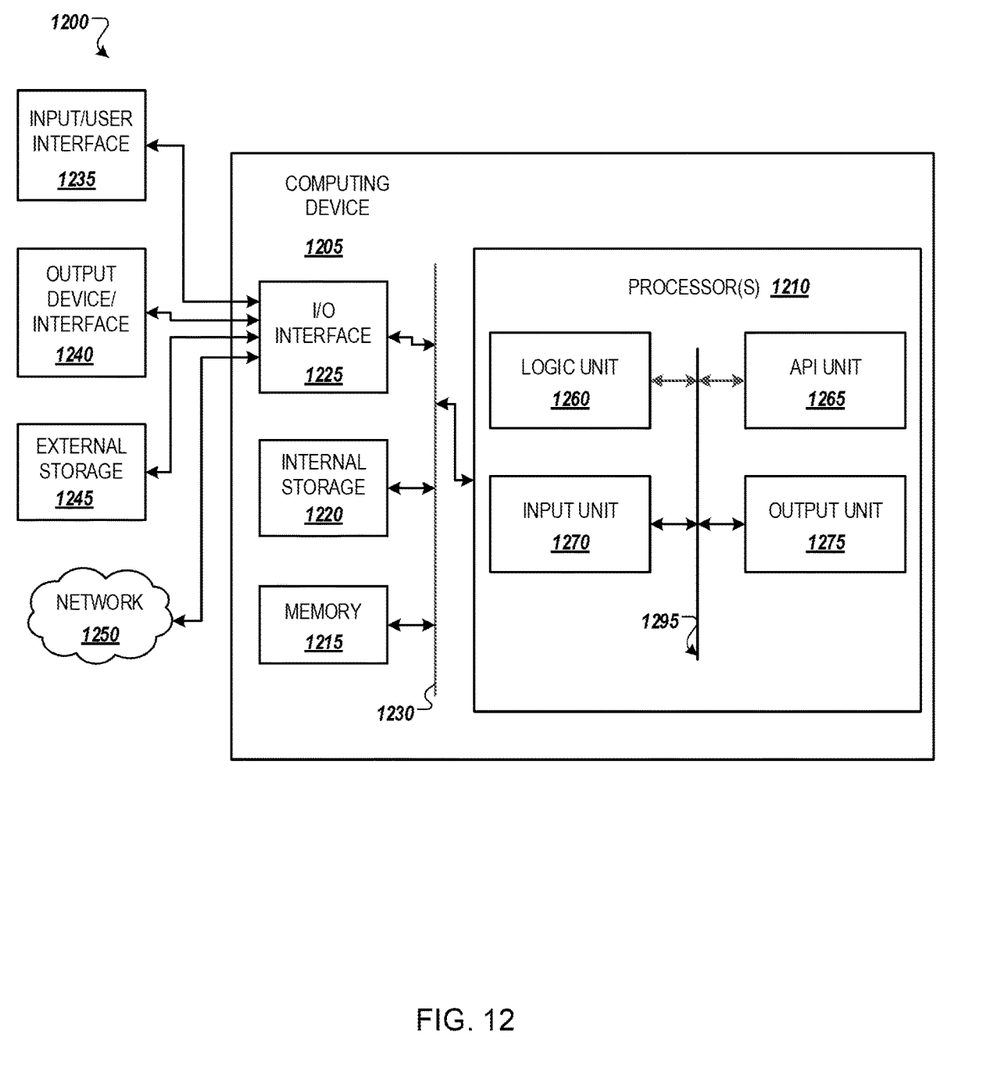
FIG. 12 illustrates an example computing environment with an example computer device suitable for use in some example implementations.

FIG. 12 illustrates an example computing environment with an example computer device suitable for use in some example implementations. Computer device 1205 in computing environment 1200 can include one or more processing units, cores, or processor(s) 1210, memory 1215 (e.g., RAM, ROM, and/or the like), internal storage 1220 (e.g., magnetic, optical, solid-state storage, and/or organic), and/or IO interface 1225, any of which can be coupled on a communication mechanism or bus 1230 for communicating information or embedded in the computer device 1205. IO interface 1225 is also configured to receive images from cameras or provide images to projectors or displays, depending on the desired implementation.

Computer device 1205 can be communicatively coupled to input/user interface 1235 and output device/interface 1240. Either one or both of the input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via IO interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

IO interface 1225 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided. Processor(s) 1210 can be in the form of hardware processors such as central processing units (CPUs) or in a combination of hardware and software units.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, the input unit 1270, the output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide an output based on the calculations described in example implementations.

Processor(s) 1210 can be configured to categorize metadata given to data sources to generalize the metadata and categorizing the ETL process to generalize the ETL process as shown in FIGS. 5-7. The processor(s) 1210 may also be configured to define propagation rules for the generalized metadata and generalized ETL process as shown in FIGS. 2 and 10. The processor(s) 1210 may also be configured to generate metadata for ETL-converted data based on the categorization of the generalized metadata and generalized ETL process, and corresponding ones of the propagation rules as shown in FIGS. 8 and 10. The processor(s) 1210 may also be configured to generate metadata categories for the metadata as shown in FIGS. 5 and 6. The processor(s) 1210 may also be configured to generate ETL categories based on the metadata of the data sources and ETL flows as shown in FIG. 7.

The processor(s) 1210 may also be configured calculate features of the metadata using a feature extraction function as shown in FIGS. 5 and 6. The processor(s) 1210 may also be configured to cluster the metadata into metadata types based on the calculated features to generate the metadata categories as shown in FIG. 6. The processor(s) 1210 may also be configured to determine whether to copy the metadata for the ETL-converted data or recalculating the metadata for the ETL-converted data using the feature extraction function as shown in FIG. 10.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for determining metadata propagation generated by an Extract, Transfer, Load (ETL) process, the method comprising:

categorizing metadata given to data sources to generalize the metadata and categorizing the ETL process to generalize the ETL process;

defining propagation rules for the generalized metadata and generalized ETL process;

generating metadata for ETL-converted data based on the categorization of the generalized metadata and generalized ETL process, and corresponding ones of the propagation rules;

generating metadata categories for the metadata; and generating ETL categories based on the metadata of the data sources and ETL flows, wherein the generating the ETL categories based on the metadata of the data sources and the ETL flows comprises categorizing the ETL flows based on similarity of at least one of an ETL type, an ETL topology, or gap of metadata between input and output of an ETL process.

2. The method of claim 1, wherein the generating metadata categories for the metadata comprises categorizing the metadata based on similarity of at least one of a plurality of attributes or a plurality of metadata types.

3. The method of claim 2, further comprising:

calculating features of the metadata using a feature extraction function; and clustering the metadata into metadata types based on the calculated features to generate the metadata categories.

4. The method of claim 1, further comprising:

determining whether to copy the metadata for the ETL-converted data or recalculating the metadata for the ETL-converted data using a feature extraction function.

5. The method of claim 1, wherein the generating the metadata for the ETL-converted data further comprises:

mapping the metadata given to the data sources with the generalized metadata and mapping ETL flows with the generalized ETL process; and propagating metadata of the ETL-converted data according to the propagation rules.

6. A non-transitory computer readable medium, storing instructions for determining metadata propagation generated by an Extract, Transfer, Load (ETL) process, the instructions comprising:

categorizing metadata given to data sources to generalize the metadata and categorizing the ETL process to generalize the ETL process;

defining propagation rules for the generalized metadata and generalized ETL process;

generating metadata for ETL-converted data based on the categorization of the generalized metadata and generalized ETL process, and corresponding ones of the propagation rules;

generating metadata categories for the metadata; and generating ETL categories based on the metadata of the data sources and ETL flows, wherein the generating the ETL categories based on the metadata of the data sources and the ETL flows comprises categorizing the ETL flows based on similarity of at least one of an ETL type, an ETL topology, or gap of metadata between input and output of an ETL process.

7. The non-transitory computer readable medium of claim 6, wherein the generating metadata categories for the metadata comprises categorizing the metadata based on similarity of at least one of a plurality of attributes or a plurality of metadata types.

8. The non-transitory computer readable medium of claim 7, further comprising:

calculating features of the metadata using a feature extraction function; and clustering the metadata into metadata types based on the calculated features to generate the metadata categories.

9. The non-transitory computer readable medium of claim 6, further comprises:

determining whether to copy the metadata for the ETL-converted data or recalculating the metadata for the ETL-converted data using a feature extraction function.

10. The non-transitory computer readable medium of claim 6, wherein the generating the metadata for the ETL-converted data further comprises:

mapping the metadata given to the data sources with the generalized metadata and mapping ETL flows with the generalized ETL process; and propagating metadata of the ETL-converted data according to the propagation rules.

11. A management server system for determining metadata propagation by an Extract, Transfer, Load (ETL) process, the system comprising:

a processor, configured to:

categorize metadata given to data sources to generalize the metadata and categorizing the ETL process to generalize the ETL process;

define propagation rules for the generalized metadata and generalized ETL process;

generate metadata for ETL-converted data based on the categorization of the generalized metadata and generalized ETL process, and corresponding ones of the propagation rules;

generate metadata categories for the metadata; and generate ETL categories based on the metadata of the data sources and ETL flows, wherein the generating the ETL categories based on the metadata of the data sources and the ETL flows comprises categorizing the ETL flows based on similarity of at least one of an ETL type, an ETL topology, or gap of metadata between input and output of an ETL process.

12. The management server system of claim 11, wherein the generating metadata categories for the metadata comprises categorizing the metadata based on similarity of at least one of a plurality of attributes or a plurality of metadata types.

13. The management server system of claim 12, further comprising:

calculate features of the metadata using a feature extraction function; and cluster the metadata into metadata types based on the calculated features to generate the metadata categories.

14. The management server system of claim 11, further comprising:

determine whether to copy the metadata for the ETL-converted data or recalculating the metadata for the ETL-converted data using a feature extraction function.

* * * * *